(12) United States Patent
Padmanaban et al.

(10) Patent No.: US 12,170,502 B1
(45) Date of Patent: Dec. 17, 2024

(54) VARIABLE REFLECTIVE SURFACE AND SOLAR PANEL CONFIGURATION

(71) Applicant: INTERNATIONAL BUSINESS MACHINES CORPORATION, Armonk, NY (US)

(72) Inventors: Manikandan Padmanaban, Chennai (IN); Sarbajit K. Rakshit, Kolkata (IN); Jagabondhu Hazra, Bangalore (IN); Marc Henri Coq, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/366,220

(22) Filed: Aug. 7, 2023

(51) Int. Cl.
*H02S 20/32* (2014.01)
*G01S 3/786* (2006.01)
*H02S 40/22* (2014.01)
*H02S 40/34* (2014.01)
*H02S 40/40* (2014.01)

(52) U.S. Cl.
CPC .......... *H02S 20/32* (2014.12); *G01S 3/7861* (2013.01); *H02S 40/22* (2014.12); *H02S 40/34* (2014.12); *H02S 40/40* (2014.12)

(58) Field of Classification Search
CPC .......... H02S 20/32; H02S 40/22; H02S 40/34; H02S 40/40; G01S 3/7861
See application file for complete search history.

(56) References Cited

U.S. PATENT DOCUMENTS

| 2017/0033733 | A1 | 2/2017 | Chandan |
| 2018/0248509 | A1* | 8/2018 | Dayama ................. H02S 20/32 |
| 2019/0138042 | A1 | 5/2019 | Dasgupta et al. |
| 2020/0321909 | A1* | 10/2020 | McGinty ................ H02S 20/32 |
| 2023/0051274 | A1 | 2/2023 | Shugar |

(Continued)

FOREIGN PATENT DOCUMENTS

| KR | 101947422 B1 | 2/2019 |
| WO | 2009079261 A2 | 6/2009 |

OTHER PUBLICATIONS

Disclosed Anonymously, "System and Method for Concentration of Solar Power Engagement in 3D and 4D Printing", ip.com, IP.com No. IPCOM000271132D, IP.com Publication Date: Oct. 25, 2022, 5 pages.

(Continued)

*Primary Examiner* — Thanh Luu
*Assistant Examiner* — Mai Thi Ngoc Tran
(74) *Attorney, Agent, or Firm* — Tihon Poltavets (57) ABSTRACT

Described is a method for managing a trackable solar panel assembly and a variable reflective surface. The method can receive solar farm characteristics and location characteristics for the solar farm. The method can also receive solar panel assembly characteristics for a solar panel assembly and variable reflective surface characteristics for a variable reflective surface. The method can optimize control parameters for the solar panel assembly and the variable reflective surface, based on the solar farm characteristics, the location characteristics, the solar panel assembly characteristics, and the variable reflective surface characteristics. The method can adjust the variable reflective surface based on the control parameters.

18 Claims, 5 Drawing Sheets

(56) References Cited

U.S. PATENT DOCUMENTS

2023/0417456 A1\* 12/2023 Ibanez .................. G05B 15/02

OTHER PUBLICATIONS

Fedkin et al., "2.1 Available Solar Radiation and How it is Measured", EME 812: Utility Solar Power and Concentration, Accessed: Jun. 9, 2023, https://www.e-education.psu.edu/eme812/node/644, 13 pages.

Grana, "Are trackers undermining their own success?", Solor Power World Online, Feb. 11, 2020, https://www.solarpowerworldonline.com/2020/02/folsom-labs-are-trackers-undermining-their-own-success/, 9 pages.

Han et al., "Energy Consumption Modeling of 4D Printing Thermal-responsive Polymers with Integrated Compositional Design for Material", Additive Manufacturing, vol. 34, Aug. 2020, 101223, https://www.sciencedirect.com/science/article/pii/S2214860420305959, 10 Pages.

Momeni et al., "Nature-Inspired Smart Solar Concentrators by 4D Printing", Renewable Energy, Accepted: Jan. 18, 2018, DOI: 10.1016/j.renene.2018.01.062, 29 pages.

Rajkumar et al., "Additive manufacturing-enabled shape transformations via FFF 4D printing", Cambridge University Press, vol. 33, Issue 24, Nov. 15, 2018, 15 pages.

Yun et al., "Automated shape transformable self solar tracking tessellated crystalline Si solar cells using in situ shape memory alloy actuation", Scientific Reports, Jan. 31, 2022, https://www.nature.com/articles/s41598-022-05466-7, 11 pages.

Zou et al., "4D Printing Pre-Strained Structures for Fast Thermal Actuation", Front. Mater., Apr. 20, 2021, Sec. Smart Materials, vol. 8-2021, https://www.frontiersin.org/articles/10.3389/fmats.2021.661999/full, 9 pages.

\* cited by examiner

VARIABLE REFLECTIVE SURFACE AND SOLAR PANEL CONFIGURATION

BACKGROUND

This disclosure relates generally to solar panels, and in particular to solar panel assemblies utilizing variable four-dimensional printed shape memory reflective surfaces.

A solar panel is an assembly of multiple photovoltaic cells configured in a framework to generate electrical energy utilizing sunlight. A solar panel, often referred to as a photovoltaic module, includes a number of photovoltaic cells capable of utilizing the photovoltaic effect to convert the energy of light directly into electricity. Currently, solar panels are roughly 15% to 23% efficient, with tracker based solar panels that can move during the day further increasing efficiency by up to 15%. While tracker based solar panels increase power generation, a ground coverage ratio (GCR) decreases to avoid shadow areas as the tracker based solar panels move to various positions during the day. As a result, an area of ground space not utilized for tracker based solar panels is greater when compared to an area of ground space for conventional fixed position solar panels.

SUMMARY

An embodiment of the present invention discloses a method, computer program product and computer system for managing a trackable solar panel assembly and a variable reflective surface, the method, computer program product and computer system can receive solar farm characteristics and location characteristics for the solar farm. The method, computer program product and computer system can receive solar panel assembly characteristics for a solar panel assembly and variable reflective surface characteristics for a variable reflective surface. The method, computer program product and computer system can optimize control parameters for the solar panel assembly and the variable reflective surface, based on the solar farm characteristics, the location characteristics, the solar panel assembly characteristics, and the variable reflective surface characteristics. The method, computer program product and computer system can adjust the variable reflective surface based on the control parameters.

DETAILED DESCRIPTION

According to an aspect of the invention, there is provided a computer-implemented method includes receiving solar farm characteristics and location characteristics for the solar farm. The computer-implemented method further includes receiving solar panel assembly characteristics for a solar panel assembly and variable reflective surface characteristics for a variable reflective surface. The computer-implemented method further includes optimizing control parameters for the solar panel assembly and the variable reflective surface, based on the solar farm characteristics, the location characteristics, the solar panel assembly characteristics, and the variable reflective surface characteristics. The computer-implemented method further includes adjusting the variable reflective surface based on the control parameters. A general technical advantage includes optimizing energy generation by a solar panel assembly through the utilization of a variable reflective surface, where the computer-implemented method adjusts the variable reflective surface to optimize the energy generated by the solar panel assembly.

In some embodiments, the computer-implemented method can further include adjusting the solar panel assembly based on the control parameters. A general technical advantage for this optional feature includes further optimizing energy generation by the computer-implemented method adjusting the solar panel assembly to optimize an amount of light captured by the variable reflective surface which reflects the light towards the solar panel assembly.

In some embodiments, for adjusting the variable reflective surface based on the control parameters, the computer-implemented method can further include providing, via an electric current, heat to a four-dimensional printed shape memory alloy embedded within the variable reflective surface, where the heat alters a shape of the variable reflective surface. A general technical advantage for this optional feature includes further optimizing energy generation by the computer-implemented method providing an electric current through energy captured by the solar panel assembly to heat and alter a shape of the variable reflective surface. Thus, resulting in a self-sustaining solar panel assembly and variable reflective surface.

In some embodiments, for adjusting the solar panel assembly based on the control parameters, the computer-implemented method can further include actuating a motor to tilt a solar cell of a solar panel assembly. A general technical advantage for this optional feature includes further optimizing energy generation by the computer-implemented method actuating a motor to position a solar cell to optimize an amount of light captured by the variable reflective surface which reflects the light towards the solar panel assembly.

In some embodiments, the computer-implemented method can further include solar farm characteristics that include solar panel layout for the solar farm and a ground cover ratio for the solar farm. A general technical advantage for this optional feature includes further defining solar farm characteristics for optimizing energy generation by the computer-implemented method.

In some embodiments, the computer-implemented method can further include location characteristics that include a geolocation for the solar farm, terrain topography for the geolocation, irradiance observations for the geolocation for a plurality of time values, and a wind profile for the geolocation. A general technical advantage for this optional feature includes further defining location characteristics for optimizing energy generation by the computer-implemented method.

In some embodiments, the computer-implemented method can further include solar panel assembly characteristics that include tracker angle constraints and the variable reflective surface characteristics include shape memory profiles for a four-dimensional printed shape memory alloy embedded within the variable reflective surface. A general technical advantage for this optional feature includes further defining solar panel assembly characteristics for optimizing energy generation by the computer-implemented method.

According to an aspect of the invention, there is provided a computer program product includes one or more computer-readable storage media and program instructions, stored on at least one of the one or more storage media, to receive solar farm characteristics and location characteristics for the solar farm. The computer program product further includes program instructions, stored on at least one of the one or more storage media, to receive solar panel assembly characteristics for a solar panel assembly and variable reflective surface characteristics for a variable reflective surface. The computer program product further includes program instructions, stored on at least one of the one or more storage media, to optimize control parameters for the solar panel assembly and the variable reflective surface, based on the solar farm characteristics, the location characteristics, the solar panel assembly characteristics, and the variable reflective surface characteristics. The computer program product further includes program instructions, stored on at least one of the one or more storage media, to adjust the variable reflective surface based on the control parameters. A general technical advantage includes optimizing energy generation by a solar panel assembly through the utilization of a variable reflective surface, where the computer program product includes program instructions to adjust the variable reflective surface to optimize the energy generated by the solar panel assembly.

In some embodiments, the computer program product can further include program instructions, stored on at least one of the one or more storage media, to adjust the solar panel assembly based on the control parameters. A general technical advantage for this optional feature includes further optimizing energy generation by the computer program product including program instructions to adjust the solar panel assembly to optimize an amount of light captured by the variable reflective surface which reflects the light towards the solar panel assembly.

In some embodiments, for program instructions, stored on at least one of the one or more storage media, to adjust the variable reflective surface based on the control parameters, the computer program product can further include program instructions, stored on at least one of the one or more storage media, to provide, via an electric current, heat to a four-dimensional printed shape memory alloy embedded within the variable reflective surface, where the heat alters a shape of the variable reflective surface. A general technical advantage for this optional feature includes further optimizing energy generation by the computer program product that include program instructions to provide an electric current through energy captured by the solar panel assembly to heat and alter a shape of the variable reflective surface. Thus, resulting in a self-sustaining solar panel assembly and variable reflective surface.

In some embodiments, for program instructions, stored on at least one of the one or more storage media, to adjust the solar panel assembly based on the control parameters, the computer program product can further include program instructions, stored on at least one of the one or more storage media, to actuate a motor to tilt a solar cell of a solar panel assembly. A general technical advantage for this optional feature includes further optimizing energy generation by the program instructions of the computer program product to actuate a motor to position a solar cell to optimize an amount of light captured by the variable reflective surface which reflects the light towards the solar panel assembly.

In some embodiments, the computer program product can further include solar farm characteristics that include solar panel layout for the solar farm and a ground cover ratio for the solar farm. A general technical advantage for this optional feature includes further defining solar farm characteristics for optimizing energy generation by the program instructions of the computer program product.

In some embodiments, the computer program product can further include location characteristics that include a geolocation for the solar farm, terrain topography for the geolocation, irradiance observations for the geolocation for a plurality of time values, and a wind profile for the geolocation. A general technical advantage for this optional feature includes further defining location characteristics for optimizing energy generation by the program instructions of the computer program product.

In some embodiments, the computer program product can further include solar panel assembly characteristics that include tracker angle constraints and the variable reflective surface characteristics include shape memory profiles for a four-dimensional printed shape memory alloy embedded within the variable reflective surface. A general technical advantage for this optional feature includes further defining solar panel assembly characteristics for optimizing energy generation by the program instructions of the computer program product.

According to an aspect of the invention, there is provided a computer system includes one or more processors, one or more computer-readable memories and one or more computer-readable storage media and program instructions, stored on at least one of the one or more storage media for execution by at least one of the one or more processors via at least one of the one or more memories, to receive solar farm characteristics and location characteristics for the solar farm. The computer system further includes program instructions, stored on at least one of the one or more storage media for execution by at least one of the one or more processors via at least one of the one or more memories, to receive solar panel assembly characteristics for a solar panel assembly and variable reflective surface characteristics for a variable reflective surface. The computer system further includes program instructions, stored on at least one of the one or more storage media for execution by at least one of the one or more processors via at least one of the one or more memories, to optimize control parameters for the solar panel assembly and the variable reflective surface, based on the solar farm characteristics, the location characteristics, the solar panel assembly characteristics, and the variable reflective surface characteristics. The computer system further includes program instructions, stored on at least one of the one or more storage media for execution by at least one of the one or more processors via at least one of the one or more memories, to adjust the variable reflective surface based on the control parameters. A general technical advantage includes optimizing energy generation by a solar panel assembly through the utilization of a variable reflective surface, where the computer system includes program instructions to adjust the variable reflective surface to optimize the energy generated by the solar panel assembly.

In some embodiments, the computer system can further include program instructions, stored on at least one of the one or more storage media for execution by at least one of the one or more processors via at least one of the one or more memories, to adjust the solar panel assembly based on the control parameters. A general technical advantage for this optional feature includes further optimizing energy generation by the computer system including program instructions to adjust the solar panel assembly to optimize an amount of light captured by the variable reflective surface which reflects the light towards the solar panel assembly.

In some embodiments, for program instructions, stored on at least one of the one or more storage media for execution by at least one of the one or more processors via at least one of the one or more memories, to adjust the variable reflective surface based on the control parameters, the computer system can further include program instructions, stored on at least one of the one or more storage media for execution by at least one of the one or more processors via at least one of the one or more memories, to provide, via an electric current, heat to a four-dimensional printed shape memory alloy embedded within the variable reflective surface, where the heat alters a shape of the variable reflective surface. A general technical advantage for this optional feature includes further optimizing energy generation by the computer system that include program instructions to provide an electric current through energy captured by the solar panel assembly to heat and alter a shape of the variable reflective surface. Thus, resulting in a self-sustaining solar panel assembly and variable reflective surface.

In some embodiments, for program instructions, stored on at least one of the one or more storage media for execution by at least one of the one or more processors via at least one of the one or more memories, to adjust the solar panel assembly based on the control parameters, the computer system can further include program instructions, stored on at least one of the one or more storage media for execution by at least one of the one or more processors via at least one of the one or more memories, to actuate a motor to tilt a solar cell of a solar panel assembly. A general technical advantage for this optional feature includes further optimizing energy generation by the program instructions of the computer system to actuate a motor to position a solar cell to optimize an amount of light captured by the variable reflective surface which reflects the light towards the solar panel assembly.

In some embodiments, the computer system can further include solar farm characteristics that include solar panel layout for the solar farm and a ground cover ratio for the solar farm. A general technical advantage for this optional feature includes further defining solar farm characteristics for optimizing energy generation by the program instructions of the computer system.

In some embodiments, the computer system can further include location characteristics that include a geolocation for the solar farm, terrain topography for the geolocation, irradiance observations for the geolocation for a plurality of time values, and a wind profile for the geolocation. A general technical advantage for this optional feature includes further defining location characteristics for optimizing energy generation by the program instructions of the computer system.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention utilizes flexible sheets of variable reflective material to cover unused ground area between solar panel assemblies on a solar farm, where the variable reflective material is embedded with four-dimensional printed shape memory alloy strips to control a cross-sectional area (i.e., shape) or topography of the variable reflective material. Controlling the cross-sectional area or topography of the variable reflective material, allows for a reflective surface of the variable reflective material to direct sun light towards one or more solar cells on the solar panel assembly. Embodiments of the present invention utilize a combination of a position of the sun, forecasted irradiance profiles, reflected solar irradiance profiles, and predicted shadow profiles, along with characteristics for the four-dimensional printed shape memory alloy material embedded in the reflective material to determine an optimal tracker angle of the solar panel assembly and an optimal cross-sectional area or topography of the variable reflective material. The optimal tracker angle of the solar panel assembly and an optimal cross-sectional area or topography of the variable reflective material allows for the embodiments of the present invention to maximize aggregated power generation per unit area for the solar farm.

Embodiments of the present invention optimization trade-off between energy gain or lost in adjusting the tracker angle of the solar panel assembly and the energy gain or lost in adjusting the cross-sectional area or topography of the variable reflective material for a forecasted time horizon by considering four-dimensional printed shape memory alloy characteristics and controller constraints (i.e., minimum, and maximum positions). Wind profiles are utilized to adjust the cross-sectional area or topography of the variable reflective material and/or to adjust a tracker angle for the solar panel assemblies to channel cooling to solar cells on the solar panel based on known and expected wind flow patterns. By channeling the cooling wind flow, embodiments of the present invention generate more energy with increase efficiency, while prolonging an expected lifespan of the solar panel assembly. Additional cooling fan disposed near or coupled to the solar panel assembly or the variable reflective material can provide additional cooling to maintain the increase efficiency.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
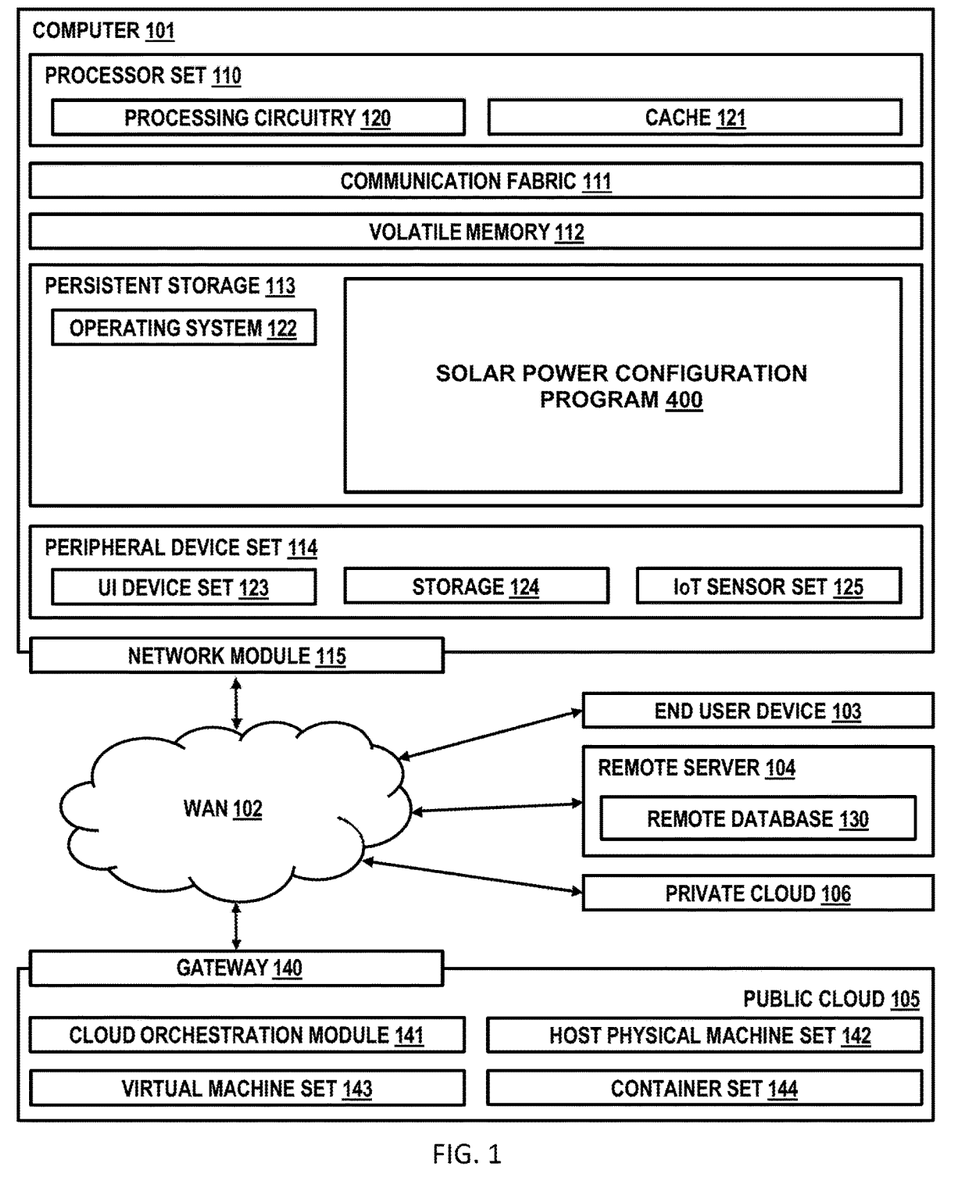
FIG. 1 is a functional block diagram illustrating a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, solar power configuration program 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 400, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 400 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 400 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
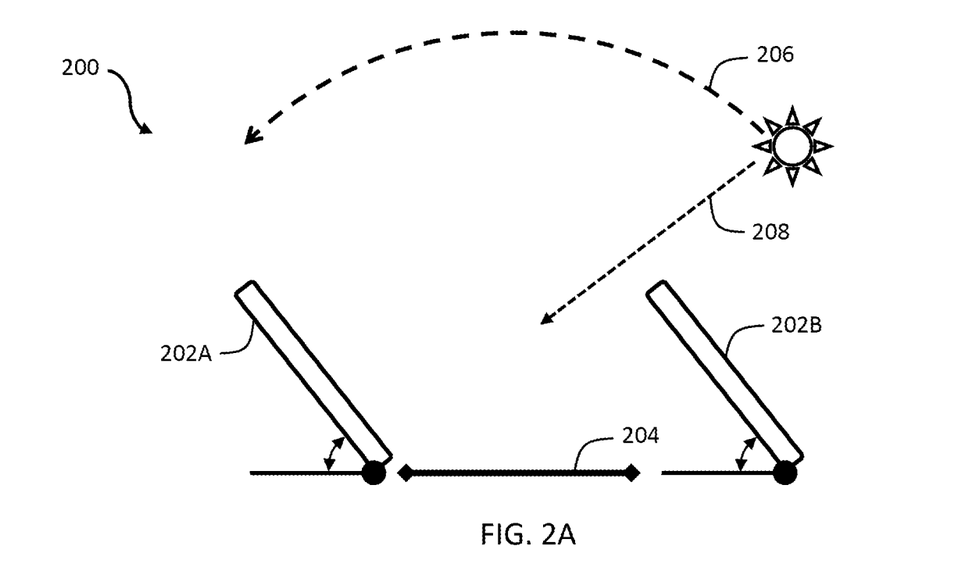
FIG. 2A depicts a side view of a trackable solar panel and a variable reflective surface in a first example configuration, in accordance with an embodiment of the present invention.
Figure 2B:
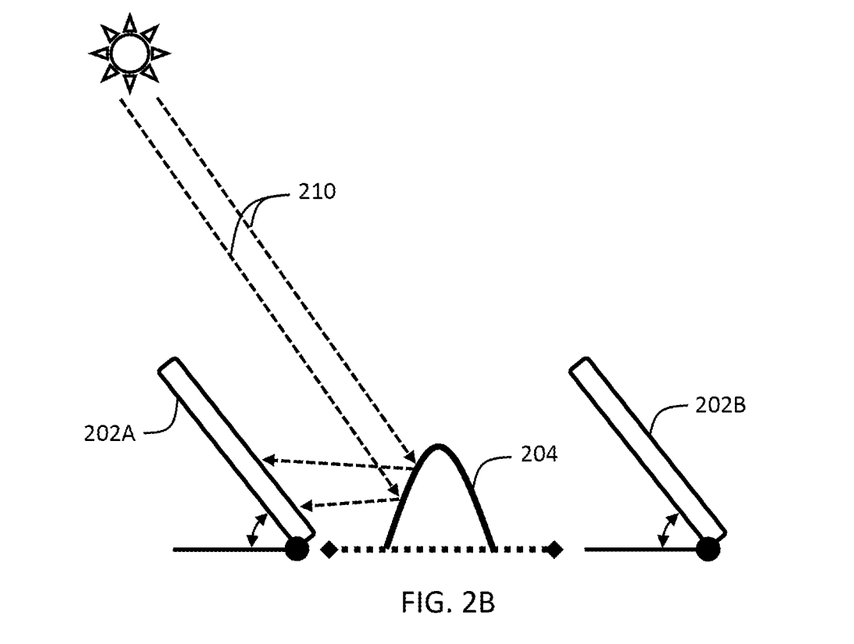
FIG. 2B depicts a side view of a trackable solar panel and a variable reflective surface in a second example configuration, in accordance with an embodiment of the present invention.
Figure 2C:
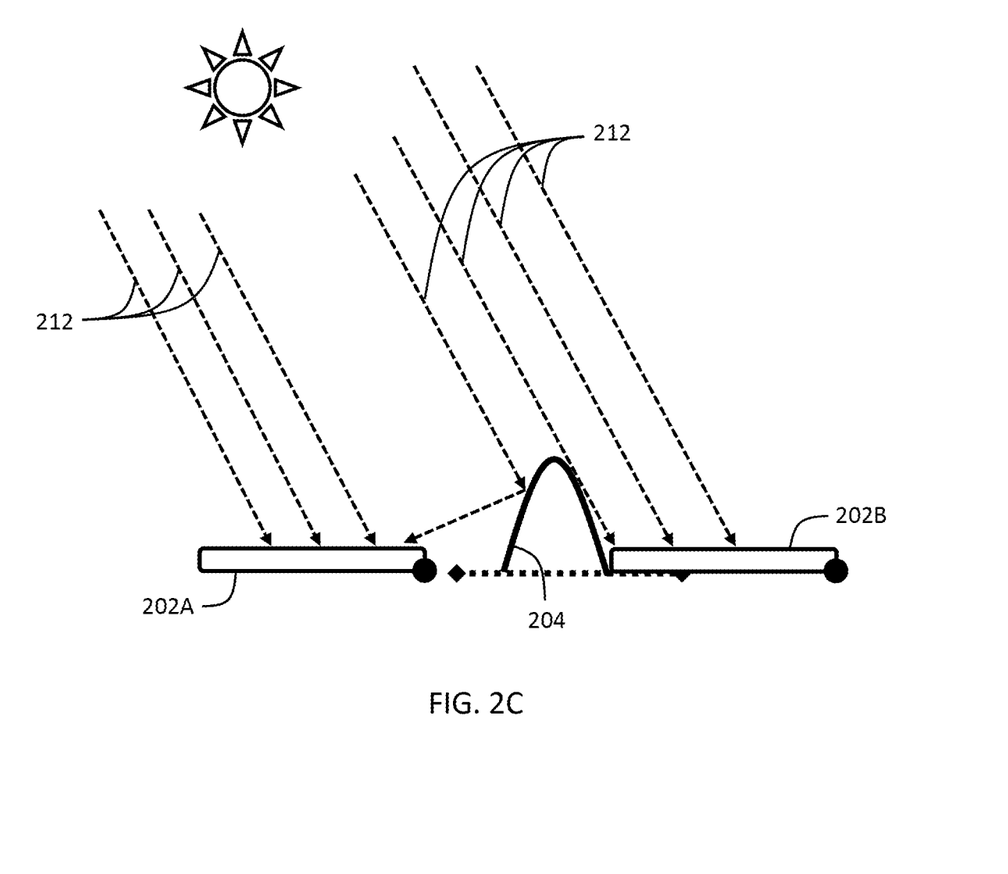
FIG. 2C depicts a side view of a trackable solar panel and a variable reflective surface in a third example configuration, in accordance with an embodiment of the present invention.

FIG. 2A depicts a side view of a trackable solar panel and a variable reflective surface in a first example configuration, in accordance with an embodiment of the present invention. In this embodiment, a portion of solar farm 200 includes solar panel assembly 202A and solar panel assembly 202B, where a ground surface between solar panel assembly 202A and 202B is covered in variable reflective surface 204 that is embedded with strips of four-dimensional printed shape memory alloy material. The four-dimensional printed shape memory alloy material represents a shape memory material modifiable with an influence from an external factor that includes humidity, temperature, light, voltage, and/or any other environmental stimuli. In this embodiment, the four-dimensional printed shape memory alloy material is embedded in the reflective material, where alterations to a shape of the four-dimensional printed material results in the reflective material forming to the shape of the altered four-dimensional printed shape memory alloy material. The shape of the embedded strips can be modified to make the reflective material surface as a flexible material so that a surface topography profile can be altered based on the sun position to reflect the maximum direct and diffuse irradiance, as illustrated in FIGS. 2B and 2C. In another embodiment, the reflective material is disposed on top of the four-dimensional printed shape memory alloy material, where alterations to a shape of the four-dimensional printed shape memory alloy material are translated to the reflective material disposed on top of the four-dimensional printed shape memory alloy material.

As the sun travels along solar path 206, solar power configuration program 400 utilizes a known location for solar farm 200 and a known solar path 206 based on the known location and a time of year to determine solar irradiance, shadow profiles for solar panel assembly 202A and 202B, and direct and indirect diffuse irradiance for the various positions of the sun along solar path 206. Based on the above determinations, solar power configuration program 400 adjusts solar panel assembly 202A and 202B, along with variable reflective surface 204. Light ray 208 represents a direct solar path created by the sun at a current position along solar path 206. In this embodiment, solar panel assembly 202A and 202B are angled perpendicular to light ray 208 to maximize efficiency during peak sunlight hours. A solar panel of each of solar panel assembly 202A and 202B is hinged at one end to allow for a varying angle between a top surface of the solar panel and a base of each of solar panel assembly 202A and 202B. Based on the determined solar irradiance, shadow profiles for solar panel assembly 202A and 202B, and direct and indirect diffuse irradiance for the sun at the current position, solar power configuration program 400 adjusts reflective surface 204 into a retracted configuration, since reflective surface 204 is not necessary to provide additional light reflection to maximize the efficiency of solar panel assembly 202A and 202B.

FIG. 2B depicts a side view of a trackable solar panel and a variable reflective surface in a second example configuration, in accordance with an embodiment of the present invention. As previously discussed with regards to FIG. 2A, in this embodiment a portion of solar farm 200 includes solar panel assembly 202A and solar panel assembly 202B, where the ground surface between solar panel assembly 202A and 202B is covered in variable reflective surface 204 that is embedded with strips of four-dimensional printed shape memory alloy material. As the sun relocates to a different position when compared to the position previously discussed in FIG. 2A, solar power configuration program 400 utilizes the known location for solar farm 200 and the known solar path based on the known location and the time of year, to determine solar irradiance, shadow profiles for solar panel assembly 202A and 202B, and direct and indirect diffuse irradiance for the various positions of the sun along solar path 206. Based on the above determinations, solar power configuration program 400 adjusts variable reflective surface 204 to redirect sunlight towards a top surface of a solar panel of solar panel assembly 202A. Light rays 210 represents the direct solar path created by the sun at the current position, where variable reflective surface 204 redirects light rays 210 towards the top surface of a solar panel of solar panel assembly 202A. Though not illustrated in FIG. 2B, another variable reflective surface is positioned near solar panel assembly 202B to directs light rays 210 towards a top surface of a solar panel of solar panel assembly 202B. In this embodiment, each solar assembly 202 in solar farm 200 includes an associated variable reflect surface for direct light rays towards a respective top surface of a solar panel.

FIG. 2C depicts a side view of a trackable solar panel and a variable reflective surface in a third example configuration, in accordance with an embodiment of the present invention. In this embodiment, solar power configuration program 400 adjusts solar panel assembly 202A and 202B, along with variable reflective surface 204. Light rays 212 represents a direct solar path created by the sun at the current position, where a combination of direct radiance from light rays 212 and reflected radiance from variable reflective surface 204 redirects light rays 212 towards a top surface of a solar panel of solar panel assembly 202A. In this example configuration, solar power configuration program 400 adjusts a shape of variable reflective surface 204 in such a manner to minimize a shaded area caused by variable reflective surface 204, where the shaded area does not fall on a neighboring solar panel assembly (i.e., solar panel assembly 202B). Solar power configuration program 400 further considers a thermal efficiency of solar panel assemblies 202A and 202B, where solar power configuration program 400 can adjust solar panel assembly 202A and 202B and/or variable reflective surface 204 if a thermal efficiency of solar panel assembly 202A and 202B begins to degrade as a result of overheating. Solar power configuration program 400 can adjust solar panel assembly 202A and 202B into the configuration shown in FIG. 2B to provide thermal relief to the top surface of the solar panels of solar panel assembly 202A and 202B. Solar power configuration program 400 can also utilize variable reflective surface 204 to deflect wind flow towards the top surface of a solar panel of solar panel assembly 202A and 202B to provide thermal relief and increase the thermal efficiency.

Figure 3:
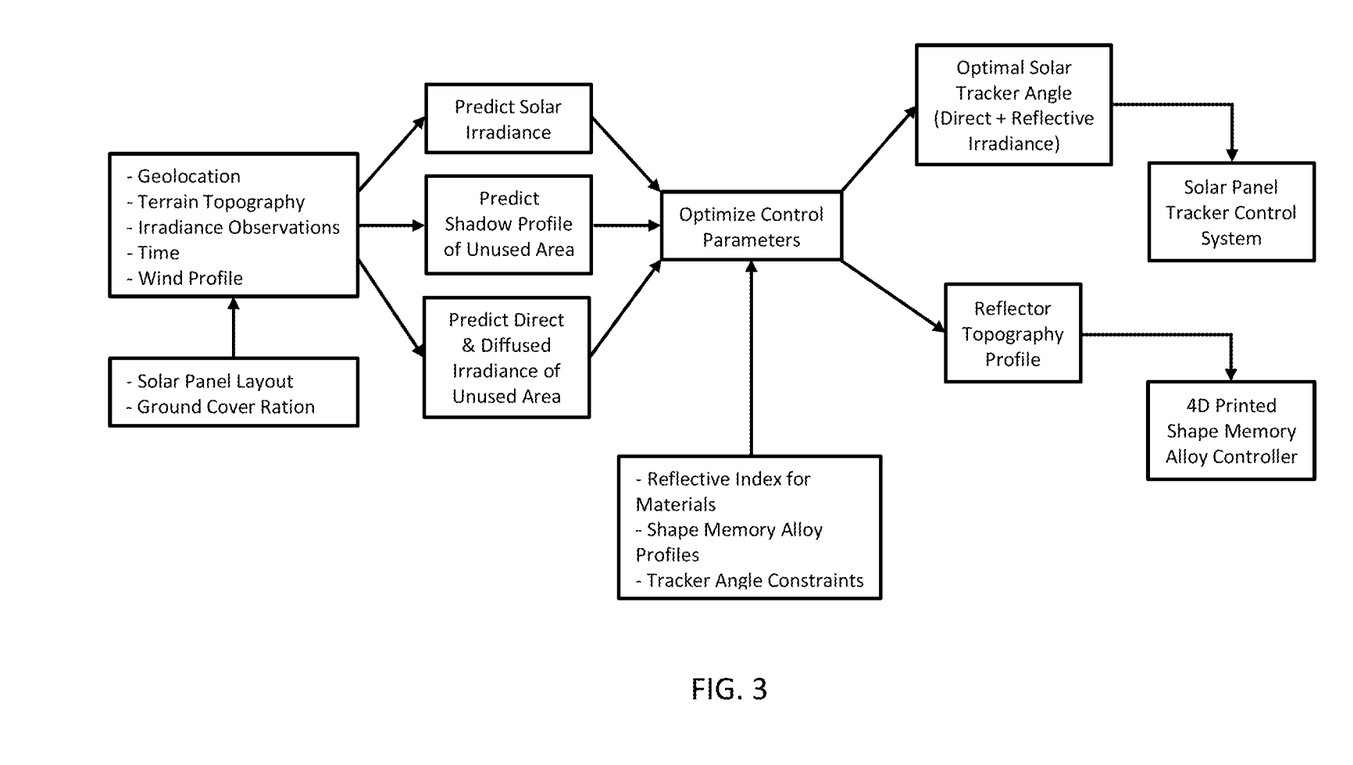
FIG. 3 depicts a process flow for a solar power configuration program for managing a trackable solar panel configuration and a variable reflective surface configuration, in accordance with an embodiment of the present invention.

FIG. 3 depicts a process flow for a solar power configuration program for managing a trackable solar panel configuration and a variable reflective surface configuration, in accordance with an embodiment of the present invention. For the process flow described herein, solar power configuration program 400 receives solar farm characteristics including solar panel layout and determines a ground coverage ratio (GCR) for a solar farm with multiple solar panels arranged in multiple rows covering an area. The GCR represents a ratio of a photovoltaic array area to the total ground area on which the solar panel is positioned. In one example, an array configured in rows of modules (i.e., solar panels), the GCR is a length of a side of one row divided by a distance between a bottom of one row and a bottom of a neighboring row. Solar power configuration program 400 also receives location characteristics for the solar farm that includes a geolocation, terrain topography, irradiance observations, time values, and wind profiles. Solar power configuration program 400 utilizes the solar farm characteristics and the location characteristics to predict solar irradiance, predict shadow profiles of unused areas, and predict direct and diffused irradiance of the unused area.

Solar power configuration program 400 optimizes control parameters utilizing the determined solar irradiance, the shadow profile, and the direct and diffused irradiance of the unused area, along with solar panel assembly and variable reflective surface information. Solar power configuration program 400 optimizing control parameters can include determining adjustments for the solar panel assembly and/or variable reflective surface for maximum energy generation, a desired amount of energy generation based on grid conditions, a desired amount of energy generation based on a certain time of day, or any other desired outcome. The solar panel assembly and variable reflective surface information includes reflective material reflective index values for the variable reflective surface, shape memory alloy profiles (e.g., temperature versus strain and stress), and tracker angle constraints for the trackable solar panels. Solar power configuration program 400 determines an optimal solar tracker angle for direct and reflective irradiance and determines a reflector topography profile for the variable reflective surface. Based on the optimal solar tracker angle for direct and reflective irradiance, solar power configuration program 400 adjusts the trackable solar panel via solar panel tracker control system. Based on the reflector topography profile for the variable reflective surface, solar power configuration program 400 adjusts the variable reflective surface via the 4D printed shape memory alloy controller by introducing an external inducement.

Figure 4:
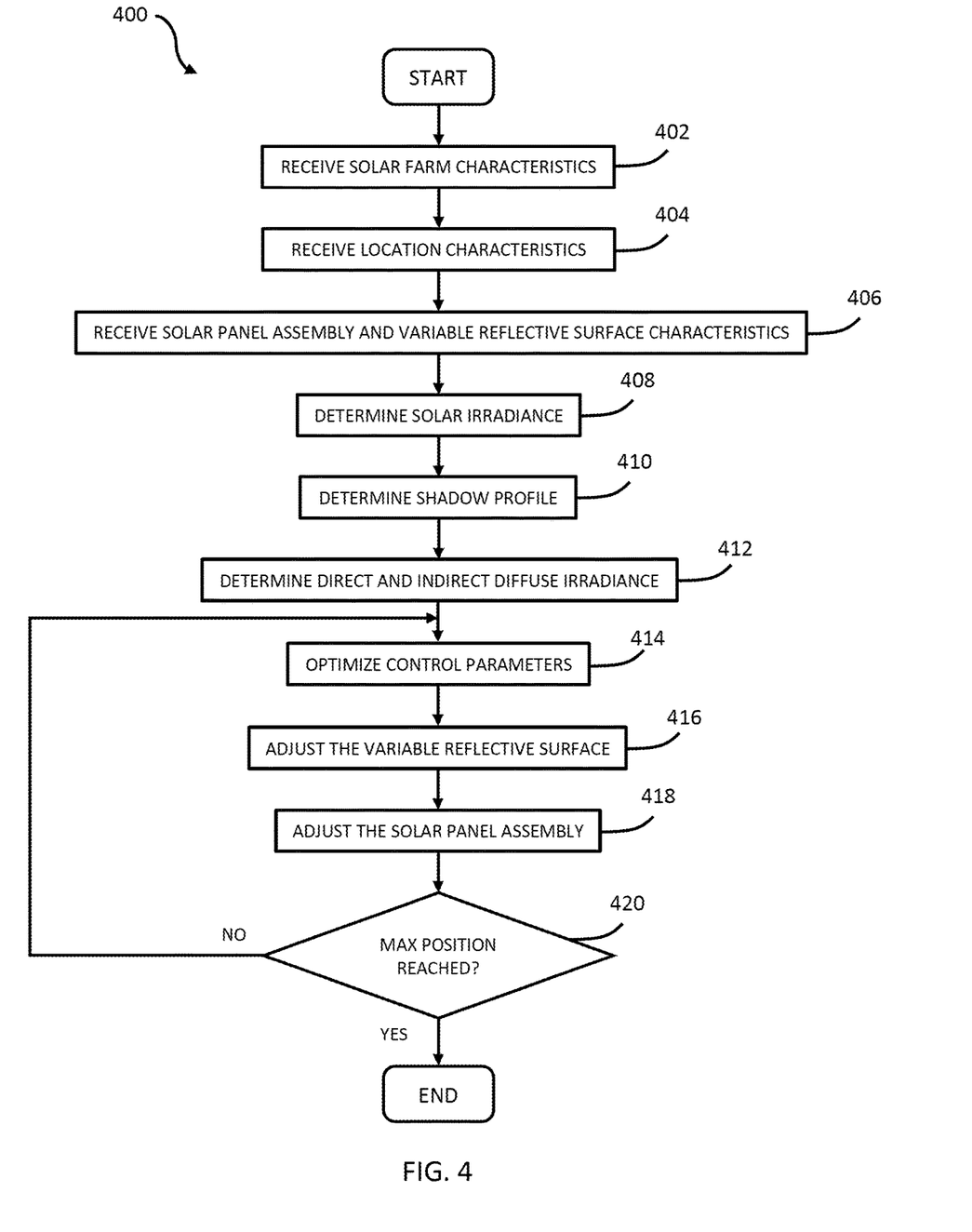
FIG. 4 depicts a flowchart for a solar power configuration program for adjusting a trackable solar panel and a variable reflective surface, in accordance with an embodiment of the present invention.

FIG. 4 depicts a flowchart for a solar power configuration program for adjusting a trackable solar panel and a variable reflective surface, in accordance with an embodiment of the present invention.

Solar power configuration program 400 receives solar farm characteristics (402). In this embodiment, solar power configuration program 400 receives the solar farm characteristics that includes solar panel layout and determines a ground cover ratio (GCR) for a solar farm with multiple solar panels and multiple variable reflective surfaces. The solar farm can include solar panels that are fixed solar panels (i.e., non-repositionable), trackable solar panels (i.e., repositionable), or a combination of fixed and trackable solar panels. For the solar panel layout, solar power configuration program 400 receives dimensions for each solar panel, a number of solar panels, an arrangement of the solar panels (e.g., 10 rows with 10 solar panels in each row), and distances between each solar panel in the arrangement of the solar panels. Solar power configuration program 400 utilizes the solar panel layout for the solar farm to determine the GCR for the solar farm. If the solar farm includes fixed solar panels, the GCR remains constant value. However, if the solar farm includes trackable solar panel, the GCR is variable depending on a position the trackable solar panel is placed. For example, if a solar panel is tilted at 30 degrees with respect to the ground surface, the GCR is lower than if a solar panel is tilted at 15 degrees with respect to the ground surface. For the solar panel layout, areas of unused ground surface include multiple variable reflective surfaces, where at least one variable reflective surface is associated with one solar panel from the multiple solar panels of the solar farm.

As previously discussed, the variable reflective surface is a reflective material with embedded four-dimensional printed shape memory alloy (e.g., nitinol), where the four-dimensional printed shape memory alloy embedded within the variable reflective surface can alter in shape based on an influence from an external factor. The external factor can include an induced change in humidity, temperature, light, voltage, and/or any other environmental stimuli. Solar power configuration program 400 induces the changes via adjustments to the variable reflective surface discussed in (416). In this embodiment, solar power configuration program 400 also receives dimensions for each variable reflective surface, a number of variable reflective surfaces, an arrangement of the variable reflective surfaces (e.g., 10 rows with 10 variable reflective surfaces in each row), and distances between each variable reflective surface in the arrangement of the variable reflective surfaces. In some embodiments, solar power configuration program 400 determines a shape and structure for each variable reflective surface based on the solar panel layout and the location characteristics discussed in (404).

Solar power configuration program 400 receives location characteristics (404). In this embodiment, solar power configuration program 400 receives the location characteristics that includes a geolocation for the solar farm, a terrain topography for an area that the solar farm covers, irradiance satellite observations with associated time values, and wind profiles for the geolocation for the solar farm. The geolocation allows for solar power configuration program 400 to determine a path for the sun and angels for light rays for each day of the year. The terrain topography allows for solar power configuration program 400 to determine placement on the variable reflective surfaces. As previously discussed, in some embodiments solar power configuration program 400 determines a shape and structure for each variable reflective surface based on the solar panel layout, while also taking into consideration the topography for the geolocation. For example, solar power configuration program 400 determines a solar panel layout and a GCR for a solar farm at a specific geolocation. Based on the location characteristics that includes the topography for the geolocation, solar power configuration program 400 determines dimensions and placement of each variable reflective surface to optimize efficiency of the solar farm. Irradiance satellite observations for various time values throughout the year allow for solar power configuration program 400 to identify solar intensity at the surface of the geolocation to identify the effects of direct and indirect irradiance at the geolocation. Wind profiles allow for solar power configuration program 400 to identify how to utilizes the variable reflective surface to provide cooling to the solar panels to optimize the thermal efficiency of each of the solar panels.

Solar power configuration program 400 receives solar panel assembly and variable reflective surface characteristics (406). In this embodiment, solar power configuration program 400 receives solar panel assembly characteristics for each solar panel in the solar farm. The solar panel assembly characteristics can include tracker angle constraints, rotational angle constraints, and operating temperature constraints. Tracker angle constraints represent an operational range between a minimum angle value and a maximum angle value for a trackable solar panel that tilts with respect to the x-axis. For example, solar power configuration program 400 receives tracker angle constraints with an operational range of 0 degrees minimum tilt to 45 degrees maximum tilt. In some embodiments, the solar panel assemblies are fixed at a set angle, for example, at a vertical position relative to the ground surface (e.g., 90 degrees) or at specified angle (45 degrees, 65 degrees etc.). Rotational angle constraints represent an operational range between a minimum rotational angle value and a maximum rotational angle for a trackable solar panel that rotates with respect to the y-axis. For example, solar power configuration program 400 receives rotational angle constraints with an operational range of a 0 degrees minimal rotational position to a 180 degrees maximum rotational position. Operating temperature constraints represent an operational temperature range for a surface temperature of a solar panel to maximize thermal efficiency and prevent overheating of solar cells on the surface of the solar panel.

Solar power configuration program 400 also receives variable reflective surface characteristics for each variable reflective surface in the solar farm. The variable reflective surface characteristics can include a reflect material reflective index value and a shape memory alloy profile (e.g., temperature versus strain and stress). As previously discussed, in one embodiment, the four-dimensional printed shape memory alloy material is embedded in the reflective material, where alterations to a shape of a four-dimensional printed shape memory alloy material results in the reflective material forming to the shape of the altered four-dimensional printed shape memory alloy material. In another embodiment, the reflective material is disposed on top of the four-dimensional printed shape memory alloy material, where alterations to a shape of the four-dimensional shape memory alloy material are translated to the reflective material disposed on top of the four-dimensional shape memory alloy material. The reflect material reflective index value represents an amount of light that is reflected versus absorbed by the reflective material. The shape memory alloy profile represents a shape profile for the four-dimensional shape memory alloy material is embedded in the reflective material when the variable reflective material is actuated with an influence from an external factor.

Solar power configuration program 400 predicts solar irradiance (408). Solar irradiance is the power per unit area (i.e., solar power density) received from the sun in the form of electromagnetic radiation. In one embodiment, solar power configuration program 400 determines solar irradiance based on the irradiance satellite observations for the geolocation of the solar farm that were in the received location characteristics from (404). In another embodiment, solar power configuration program 400 determines solar irradiance utilizing a spatial temporal learning model for the geolocation for a given time of year (i.e., time value) to predict the solar radiance for the geolocation of the solar far. For the solar radiance, solar power configuration program 400 can also consider any geographical impacts (e.g., body of water, elevation) or weather-related impacts (e.g., cloud cover, fog) impacting the solar irradiance when determining solar irradiance for a given time of the year for the geolocation of the solar farm. In yet another embodiment, solar power configuration program 400 can receive solar irradiance information for the geolocation from a third-party provider.

Solar power configuration program 400 predicts a shadow profile (410). Solar power configuration program 400 predicts a shadow profile of unused areas created by the multiple solar panels. Solar power configuration program 400 utilizes the solar panel layout for the solar farm, the topography at the geolocation, the dimensions for each solar panel, and the determined GCR for a specific time of year to determine a shadow profile. With the solar panel layout for the solar farm, solar power configuration program 400 determines a configuration for the layout (e.g., 15 rows with 20 solar panel assemblies in each row) and spacing between each solar panel assembly from the multiple solar assemblies of the solar farm. With the dimensions for each solar panel, a geolocation for the solar, and the topography at the geolocation, solar power configuration program 400 determines dimensions for each shadow created by each of the solar panels. The topography of a surface onto which the shadow is cast by a solar panel can affect the dimensions of the shadow, thus affecting GCR for the solar farm. In one embodiment, where the multiple solar panels are fixed, solar power configuration program 400 determines the shadow profile for the multiple solar panels is constant and is based on a time of year and a position of the sun. In another embodiment, the multiple solar panels track the movement of the sun, solar power configuration program 400 determines the shadow profile for the multiple solar panels can vary based on the time of year and the position of the sun.

Solar power configuration program 400 predicts direct and indirect irradiance (412). For discussion purposes, direct radiance represents solar irradiance that directly reaches a surface (e.g., a top surface with a solar cell of a solar panel) and indirect irradiance represent solar irradiance that is diffused or reflected to reach the surface. An example of diffused irradiance can include solar irradiance passing through cloud cover and an example of reflected irradiance can include solar irradiance reflecting off a ground surface. Solar power configuration program 400 utilizes the predicted solar irradiance, along with known topography for the geolocation and historical weather patterns for the geolocation, to predict direct and indirect irradiance.

Solar power configuration program 400 optimizes the control parameters (414). In this embodiment, solar power configuration program 400 optimizes the control parameter by performing a net energy gain optimization. Solar power configuration program 400 determines a tracker angle and a topographical shape for each of the variable reflective surfaces to maximize the energy generated by solar panel and minimize energy lost in altering a shape of the variable reflective surface. Solar power configuration program 400 can utilize the net energy gain optimization equation (a) below:

$$J = \text{Max.} \sum_{j=1}^{N} \quad \text{(a)}$$
$$\left\{ W_G \cdot E_G\left(\alpha_j^*, \vec{M_j^*}\right) - w_L \cdot E_L\left(\alpha_j^*, \vec{M_j^*}\right) - \sum_{i=1}^{N} w_{uP_i}(\alpha_j - \alpha_j^*)^2 \right\} -$$
$$\sum_{i=1}^{N} w_{uP_i}\left(\vec{M_j} - \vec{M_j^*}\right)^2 \Big\}$$

The net energy gain optimization equation (a) is subject to, $\vec{M}^{min} \leq \vec{M}_j \leq \vec{M}^{max}$ and $\alpha^{min} \leq \alpha_j \leq \alpha^{max}$. J represents a cost function (total energy gain), $\alpha_j^*$ represents optimal tracker angle for the forecasted time instant j, $\vec{M_j^*}$ represents optimal topography profile for the forecasted time instant j, $E_G$ represents energy gain by changing the tracker angle and topography profile, $E_L$ represents energy lost by modulating the tracker angle and topography profile. $w_G$, $w_L$ respectively represent weighing coefficient for an additional energy generated from solar panel and energy lost in changing the topography profile, and $\vec{M}^{max}$, $\alpha^{max}$ respectively represent maximum limit for topography profile and maximum limit for tracker angle.

The portion of the net energy gain optimization equation (a) representing the additional energy generation is represented by sub-equation (b) below:

$$w_G \cdot E_G(\alpha_j^*, \vec{M_j^*}) \quad \text{(b)}$$

The portion of the net energy gain optimization equation (a) representing the energy lost in altering a shape of the variable reflective surface is represented by sub-equation (c) below:

$$w_L \cdot E_L(\alpha_j^*, \vec{M_j^*}) \quad \text{(c)}$$

The portion of the net energy gain optimization equation (a) representing a penalization for alterations to the tracker angle is represented by sub-equation (d) below:

$$\sum_{i=1}^{N} w_{uP_i}(\alpha_j - \alpha_j^*)^2 \quad \text{(d)}$$

The portion of the net energy gain optimization equation (a) representing a penalization for alterations to the variable reflective surface is represented by sub-equation (e) below:

$$\sum_{i=1}^{N} w_{uP_i}\left(\vec{M_j} - \vec{M_j^*}\right)^2 \quad \text{(e)}$$

In this embodiment, solar power configuration program 400 also optimizes the control parameter by performing a forecast horizon optimization. Solar power configuration program 400 performs adjustments at set intervals, while accounting for the forecast horizon as the sun moves throughout any given day. Solar power configuration program 400 can utilize the forecast horizon optimization equation (f) below:

$$J = \sum_{i=1}^{N} w_{L_i}\left(L_i^r - L_i^m\left(\alpha, \vec{M}\right)\right)^2 + \quad \text{(f)}$$
$$\sum_{i=1}^{N} w_{CR_i}\left(R_i^r - R_i^m\left(\alpha, \vec{M}\right)\right)^2 + \sum_{i=1}^{N} w_{u(\alpha)_i}(\Delta u)^2 + \sum_{i=1}^{N} w_{v(\vec{M})_i}(\Delta v)^2$$

The forecast horizon optimization equation (f) is subject to, $0 \leq L_i^m \leq L^{max}$, $0 \leq R_i^m \leq R^{max}$, and $L^{max} + R^{max} \leq LR^{max}$. J represents a cost function over the receding horizon. $L_i^r$ represent optimal irradiance for the instant i. $L_i^m$ represent measure irradiance for the instance i. $R_i^r$ represents optimal reflective irradiance profile (direct+diffuse) for the instant i. $R_i^m$ represents capture reflective irradiance profile (direct+diffuse) for the instant i, which is a function topography (i.e., shape) of the variable reflective material. u, v respectively represent solar tracker controller variable and the variable reflective material controller variable. $w_{R_i}$, $w_{L_i}$ respectively represent weighting coefficient for irradiance from the variable reflective material and direct solar panel. $w_{u\alpha_i}$, $w_{v\vec{M}_i}$ respectively represent penalizing coefficient for alteration in tracker angle controller for the solar panel and the variable reflective material controller. $R^{max}$, $L^{max}$, $LR^{max}$ respectively represent maximum limit for reflector irradiance profile, directed solar irradiance level and solar panel irradiance limit. $\alpha$ represents a tracker angle for the trackable solar panel. $\vec{M}$ represents a topography of the variable reflective material.

The portion of the forecast horizon optimization equation (f) representing the direct solar irradiance profile is represented by sub-equation (g) below:

$$\sum_{i=1}^{N} w_{L_i}\left(L_i^r - L_i^m\left(\alpha, \vec{M}\right)\right)^2 \quad \text{(g)}$$

The portion of the forecast horizon optimization equation (f) representing the reflective irradiance profile is represented by sub-equation (h) below:

$$\sum_{i=1}^{N} w_{CR_i}\left(R_i^r - R_i^m\left(\alpha, \vec{M}\right)\right)^2 \quad \text{(h)}$$

Solar power configuration program 400 adjusts the variable reflective surface (416). As previously discussed, the variable reflective surface is a reflective material with embedded four-dimensional printed shape memory alloy (e.g., nitinol), where the four-dimensional printed shape memory alloy embedded within the variable reflective surface can alter in shape based on an influence from an external factor. The external factor can include an induced change in humidity, temperature, light, voltage, and/or any other environmental stimuli. In one embodiment, solar power configuration program 400 adjusts the variable reflective surface by providing heat via an electrical current to the four-dimensional printed shape memory alloy embedded within the variable reflective surface. By providing heat via the electrical current, solar power configuration program 400 adjusts a shape of the variable reflecting surface from a non-actuated position to an actuated position. The actuated position is such that light from the sun is reflected towards a top surface of a solar panel that includes one or more solar cells. Solar power configuration program 400 can also adjust the variable reflective surface by providing heat via a mechanically connected heat dissipating device coupled to the solar panel, where solar power configuration program 400 actuates a mechanical connection between the heat dissipating device of the solar panel such that the mechanical connection provides heats transfer between the solar panel and the four-dimensional printed shape memory alloy embedded within the variable reflective surface. In another embodiment, solar power configuration program 400 can adjust a position of a trackable solar panel assembly to direct and/or reflect light towards the variable reflective surface to provide heat and subsequent actuation of the four-dimensional printed shape memory alloy embedded within the variable reflective surface.

In another embodiment, solar power configuration program 400 adjusts the variable reflective surface by providing cooling via a liquid to the four-dimensional printed shape memory alloy embedded within the variable reflective surface. Solar power configuration program 400 can activate one or more liquid cooling valves to release cooling liquid onto a surface of the variable reflective surface. Solar power configuration program 400 providing a cooling effect to the variable reflective surface results in an adjustment of the variable reflective surface from an actuated position to a non-actuated position or a non-actuated position to an actuated position. In yet another embodiment, solar power configuration program 400 adjusts the variable reflective surface by providing cooling via one or more fans positioned to direct airflow to the four-dimensional printed shape memory alloy embedded within the variable reflective surface. Solar power configuration program 400 can activate the one or more cooling fans and set a desired fan speed to regulate the airflow towards the four-dimensional printed shape memory alloy embedded within the variable reflective surface. In yet another embodiment, solar power configuration program 400 adjusts a position of a trackable solar panel assembly to direct airflow towards the variable reflective surface, thus providing the cooling effect to the four-dimensional printed shape memory alloy embedded within the variable reflective surface.

Solar power configuration program 400 adjusts the solar panel assembly (418). For trackable solar panel assemblies, solar power configuration program 400 can tilt and/or rotate the solar panel assembly to optimize energy generation. In one embodiment, solar power configuration program 400 adjusts a solar panel assembly by actuating a motor to tilt a solar panel assembly based on an adjusted position of the variable reflective surface. Solar power configuration program 400 actuates the motor to tilt the solar panel assembly until an optimal angle is reached to receive reflected light from the variable reflective surface. In another embodiment, solar power configuration program 400 adjusts a solar panel assembly by actuating a motor to rotate a solar panel assembly based on an adjusted position of the variable reflective surface. Solar power configuration program 400 actuates the motor to rotate the solar panel assembly until an optimal position is reached to receive reflected light from the variable reflective surface. With the adjustments to the solar panel assembly and the variable reflective surfaces, solar power configuration program 400 increase energy generation, while decreasing the GCR for the solar farm.

Solar power configuration program 400 determines whether a maximum position for the solar panel assembly or the variable reflective surface is reached (decision 420). The maximum position for the variable solar panel assembly or the variable reflective surface is based on limitations (i.e., maximum position and minimum position) for an operational range defined by the received solar panel assembly and the variable reflective surface characteristics received in (406). In the event solar power configuration program 400 determines the maximum position for the solar panel assembly or the variable reflective surface was not reached ("no" branch, decision 420), solar power configuration program 400 reverts to optimizing the control parameters. In the event solar power configuration program 400 the maximum position for the solar panel assembly or the variable reflective surface was reached ("yes" branch, decision 420), solar power configuration program 400 ceases operations and places the solar panel assembly and the variable reflective surface into a standby mode until subsequent following day.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving solar farm characteristics and location characteristics for the solar farm;
   receiving solar panel assembly characteristics for a solar panel assembly and variable reflective surface characteristics for a variable reflective surface;
   optimizing control parameters for the solar panel assembly and the variable reflective surface, based on the solar farm characteristics, the location characteristics, the solar panel assembly characteristics, and the variable reflective surface characteristics; and
   providing, via an electric current, heat to a four-dimensional printed shape memory alloy embedded within the variable reflective surface based on the control parameters, wherein the heat adjusts the variable reflective surface.

2. The computer-implemented method of claim 1, further comprising:
   adjusting the solar panel assembly based on the control parameters.

3. The computer-implemented method of claim 2, wherein adjusting the solar panel assembly based on the control parameters further comprises:
   actuating a motor to tilt a solar cell of the solar panel assembly.

4. The computer-implemented method of claim 1, wherein the solar farm characteristics include solar panel layout for the solar farm and a ground cover ratio for the solar farm.

5. The computer-implemented method of claim 1, wherein the location characteristics include a geolocation for the solar farm, terrain topography for the geolocation, irradiance observations for the geolocation for a plurality of time values, and a wind profile for the geolocation.

6. The computer-implemented method of claim 1, wherein the solar panel assembly characteristics include tracker angle constraints and the variable reflective surface characteristics include shape memory profiles for the four-dimensional printed shape memory alloy embedded within the variable reflective surface.

7. A computer program product comprising:
   one or more computer-readable storage media;
   program instructions, stored on at least one of the one or more storage media, to receive solar farm characteristics and location characteristics for the solar farm;
   program instructions, stored on at least one of the one or more storage media, to receive solar panel assembly characteristics for a solar panel assembly and variable reflective surface characteristics for a variable reflective surface;
   program instructions, stored on at least one of the one or more storage media, to optimize control parameters for the solar panel assembly and the variable reflective surface, based on the solar farm characteristics, the location characteristics, the solar panel assembly characteristics, and the variable reflective surface characteristics; and program instructions, stored on at least one of the one or more storage media, to provide, via an electric current, heat to a four-dimensional printed shape memory alloy embedded within the variable reflective surface based on the control parameters, wherein the heat adjusts the variable reflective surface.

8. The computer program product of claim 7, further comprising:

program instructions, stored on at least one of the one or more storage media, to adjust the solar panel assembly based on the control parameters.

9. The computer program product of claim 8, wherein program instructions, stored on at least one of the one or more storage media, to adjust the solar panel assembly based on the control parameters further comprises:

program instructions, stored on at least one of the one or more storage media, to actuate a motor to tilt a solar cell of the solar panel assembly.

10. The computer program product of claim 7, wherein the solar farm characteristics include solar panel layout for the solar farm and a ground cover ratio for the solar farm.

11. The computer program product of claim 7, wherein the location characteristics include a geolocation for the solar farm, terrain topography for the geolocation, irradiance observations for the geolocation for a plurality of time values, and a wind profile for the geolocation.

12. The computer program product of claim 7, wherein the solar panel assembly characteristics include tracker angle constraints and the variable reflective surface characteristics include shape memory profiles for the four-dimensional printed shape memory alloy embedded within the variable reflective surface.

13. A computer system comprising:

one or more processors, one or more computer-readable memories and one or more computer-readable storage media;

program instructions, stored on at least one of the one or more storage media for execution by at least one of the one or more processors via at least one of the one or more memories, to receive solar farm characteristics and location characteristics for the solar farm;

program instructions, stored on at least one of the one or more storage media for execution by at least one of the one or more processors via at least one of the one or more memories, to receive solar panel assembly characteristics for a solar panel assembly and variable reflective surface characteristics for a variable reflective surface;

program instructions, stored on at least one of the one or more storage media for execution by at least one of the one or more processors via at least one of the one or more memories, to optimize control parameters for the solar panel assembly and the variable reflective surface, based on the solar farm characteristics, the location characteristics, the solar panel assembly characteristics, and the variable reflective surface characteristics; and program instructions, stored on at least one of the one or more storage media for execution by at least one of the one or more processors via at least one of the one or more memories, to provide, via an electric current, heat to a four-dimensional printed shape memory alloy embedded within the variable reflective surface based on the control parameters, wherein the heat adjusts the variable reflective surface.

14. The computer system of claim 13, further comprising:

program instructions, stored on at least one of the one or more storage media for execution by at least one of the one or more processors via at least one of the one or more memories, to adjust the solar panel assembly based on the control parameters.

15. The computer system of claim 14, wherein program instructions, stored on at least one of the one or more storage media for execution by at least one of the one or more processors via at least one of the one or more memories, to adjust the solar panel assembly based on the control parameters further comprises:

program instructions, stored on at least one of the one or more storage media for execution by at least one of the one or more processors via at least one of the one or more memories, to actuate a motor to tilt a solar cell of the solar panel assembly.

16. The computer system of claim 13, wherein the solar farm characteristics include solar panel layout for the solar farm and a ground cover ratio for the solar farm.

17. The computer system of claim 13, wherein the location characteristics include a geolocation for the solar farm, terrain topography for the geolocation, irradiance observations for the geolocation for a plurality of time values, and a wind profile for the geolocation.

18. The computer system of claim 13, wherein the solar panel assembly characteristics include tracker angle constraints and the variable reflective surface characteristics include shape memory profiles for the four-dimensional printed shape memory alloy embedded within the variable reflective surface.

\* \* \* \* \*